(12) United States Patent
Swift et al.

(10) Patent No.: US 6,202,316 B1
(45) Date of Patent: Mar. 20, 2001

(54) COORDINATE MEASURING MACHINE GUIDEWAY COMPOSITE STRUCTURE AND METHOD OF MANUFACTURE

(76) Inventors: Timothy J. Swift, 1699 W. San Remo St., Gilbert, AZ (US) 85233; John M. Hunter, 1721 W. Calle Del Norte, Chandler, AZ (US) 85224

( * ) Notice: Subject to any disclaimer, the term of this patent is extended or adjusted under 35 U.S.C. 154(b) by 0 days.

(21) Appl. No.: 09/059,861

(22) Filed: Apr. 14, 1998

(51) Int. Cl.$^7$ .................................................. G01B 5/008
(52) U.S. Cl. ........................ 33/503; 33/1 M; 33/702; 33/556; 33/DIG. 11
(58) Field of Search ........................ 33/1 M, 702–704, 33/503, 556, 557, 558, 559, 560, 561, DIG. 11, DIG. 19

(56) References Cited

U.S. PATENT DOCUMENTS

| | | | |
|---|---|---|---|
| 3,921,306 | * 11/1975 | Provi | 33/379 |
| 4,763,507 | * 8/1988 | Zofchak | 33/502 |
| 4,833,789 | * 5/1989 | Zona | 33/503 |
| 4,882,847 | 11/1989 | Hemmelgarn et al. . | |
| 4,887,360 | 12/1989 | Hemmelgarn et al. . | |
| 4,888,247 | 12/1989 | Zweben et al. . | |
| 4,932,136 | 6/1990 | Schmitz et al. . | |
| 5,130,523 | * 7/1992 | Raleigh et al. | 33/503 |
| 5,189,805 | * 3/1993 | Matsumoto et al. | 33/503 |
| 5,224,017 | 6/1993 | Martin . | |
| 5,247,749 | 9/1993 | Bury . | |
| 5,257,461 | 11/1993 | Raleigh et al. . | |
| 5,269,067 | 12/1993 | Waedele et al. . | |
| 5,330,124 | * 7/1994 | Le Touche | 244/117 A |
| 5,333,386 | 8/1994 | Breyer et al. . | |
| 5,339,531 | 8/1994 | Ogiwara . | |
| 5,382,505 | 1/1995 | Schmidt et al. . | |
| 5,388,343 | * 2/1995 | Garau et al. | 33/503 |
| 5,396,712 | 3/1995 | Herzog . | |
| 5,402,981 | 4/1995 | McMurtry . | |
| 5,426,861 | 6/1995 | Shelton . | |
| 5,554,430 | 9/1996 | Pollatta et al. . | |
| 5,555,633 | 9/1996 | Stott . | |
| 5,556,565 | 9/1996 | Kirkwood et al. . | |
| 5,581,012 | 12/1996 | Critelli . | |
| 5,593,752 | 1/1997 | Pollatta et al. . | |
| 5,688,426 | 11/1997 | Kirkwood et al. . | |

* cited by examiner

Primary Examiner—Andrew H. Hirshfeld
(74) Attorney, Agent, or Firm—Schmeiser, Olsen & Watts.

(57) ABSTRACT

A composite structure for use in a coordinate measuring machine (CMM) includes a metallic material joined to a non-metallic material, wherein each material possesses a coefficient of thermal expansion (CTE) less than or equal to $6.1 \times 10^{-6}$ cm/cm/° C. The metallic material may be INVAR, an alloy of iron and nickel, and the non-metallic material may be carbon fiber reinforced composite. Also, the metallic material may be in the shape of a space frame with the non-metallic material in the shape of stiffeners adhered to the space frame. The modulus of elasticity of the combined space frame and stiffeners is preferably greater than 140 GPa. The space frame may be a modified I-beam with reinforcing structures and mass-reducing cutouts. The stiffener may be a square tube, wherein one stiffener is adhered to each I-beam flange of the space frame. The stiffeners are ground and lapped to produce bearing tracks of high precision for air bearings to traverse. Additionally, a method for fabricating a CMM includes the steps of assembling and/or fabricating the materials and structures described above.

25 Claims, 5 Drawing Sheets

COORDINATE MEASURING MACHINE GUIDEWAY COMPOSITE STRUCTURE AND METHOD OF MANUFACTURE

BACKGROUND OF THE INVENTION

1. Technical Field

This invention relates to the field of coordinate measuring machines. More specifically the invention relates to a guideway composite structure and method of manufacture for coordinate measuring machines.

2. Background Art

A coordinate measuring machine (CMM) is a device used to measure the dimensions of a work piece. Essentially, a CMM includes a probe attached to a mechanism capable of moving the probe in three dimensions and determining the location of the probe tip in space with respect to a three-dimensional coordinate system. By aligning the probe tip with multiple points on the surface of a work piece, the work piece can be mapped out within the coordinate system. As the need increases for machining or producing components within very tight tolerances, the need also increases for highly accurate and precise CMMs. Accuracy refers to the error in a measurement from the true value, while precision refers to the consistency with which a measurement can be made within a certain error range. If a CMM is limited in the accuracy or precision with which it can measure the dimensions of a work piece, then any resulting errors in measurement will carry through into a device manufactured using the measurements.

Several types of CMMs exist, each variation addresses ways to improve the accuracy or precision of measurements. Some of the patents describing such technologies include: Critelli, U.S. Pat. No. 5,581,012; Stott, U.S. Pat. No. 5,555,633; Shelton, U.S. Pat. No. 5,426,861; McMurtry, U.S. Pat. No. 5,402,981; Herzog, U.S. Pat. No. 5,396,712; Ogiwara, U.S. Pat. No. 5,339,531; Breyer et al., U.S. Pat. No. 5,333,386; Waeldele et al., U.S. Pat. No. 5,269,067; Raleigh et al., U.S. Pat. No. 5,257,461; Bury, U.S. Pat. No. 5,247,749; Schmitz et al., U.S. Pat. No. 4,932,136; and Hemmelgarn et al., U.S. Pat. Nos. 4,887,360 and 4,882,847, all of which are herein incorporated by reference for their pertinent and supportive teachings. However, conventional CMMs, such as those described in the references above, do not attain the accuracy and precision desired by today's users of CMMs.

One of the problems with conventional CMMs is that significant errors are introduced into measurements because of environmental temperature changes. There are essentially two related pathways through which temperature influences CMM measurements. First, most materials used in CMMs have a coefficient of thermal expansion (CTE) greater than $6.1 \times 10^{-6}$ centimeter/centimeter/° Celsius ($3.4 \times 10^{-6}$ inch/inch/° Fahrenheit) such that environmental temperature changes cause significant expansion or contraction of the CMM structure to introduce noticeable errors into measurements. Second, even though the temperature is held constant while taking measurements, some materials in the CMM structure have a relatively large thermal inertia. Accordingly, if the materials have not yet stabilized at the environmental temperature, then, as the temperature of the CMM structure changes to reflect the environmental temperature, the structure will continue to expand or contract until equilibrium is established.

Attempts to use low CTE materials and decrease thermal inertia have not succeeded in attaining a CMM with the needed accuracy and precision. INVAR 36, an alloy of 64% iron and 36% nickel has a near zero CTE, however, it has only been used in minor components of CMMs such as measurement scales and reference samples. INVAR 36 has not been used in major structural portions of CMMs primarily because it has a relatively low modulus of elasticity (stiffness) of 141 GigaPascals (GPa) ($20.5 \times 10^6$ pounds per square inch (psi)). Accordingly, INVAR structures tend to flex and re-introduce errors that perhaps were otherwise reduced because of their low CTE.

Aluminum is widely used, even though it has a high CTE of $22.5 \times 10^{-6}$ cm/cm/° C., because it has a high thermal conductivity and is readily fabricated into complex geometries designed to stabilize the CMM structure. The high thermal conductivity reduces the problem of thermal inertia, and the complex geometries theoretically reduce errors from expansion and contraction. However, aluminum CMMs have proven incapable of achieving the accuracy and precision now in demand.

Ceramic, specifically alumina-ceramic (such as AD96), is used for some major CMM components, such as the cross beam guideway (bridge) in a bridge-style CMM. Ceramic has a high modulus of elasticity of 303 GPa ($44 \times 10^6$ psi), a CTE of $6.1 \times 10^{-6}$ cm/cm/° C., and, accordingly, provides a sufficiently stiff structure that is lightweight. However, 16–20 weeks are required to produce a final ceramic product, such structures are costly, and it is impossible to produce large monolithic structures of the size needed in typical CMMs. Instead, modular portions are produced and secured together, increasing cost. Also, ceramic is brittle and susceptible to cracking.

Granite is also used for a few major CMM components, however, granite has proven suitable only for a static base and rail or non-moving components. Granite may be finished by polishing and lapping techniques to produce excellent air bearing tracks. Unfortunately, granite is a poor choice for a moving guideway because it has a low modulus of elasticity of 26 to 86 GPa (3.8 to $12.5 \times 10^6$ psi) and must have a large cross-section to attain sufficient stiffness and therefore additional mass. The resulting guideway is much heavier than desirable as a moving member in a CMM.

Thus, it can be seen from the above discussion that it would be an improvement in the art to provide a CMM structure with a low CTE, low thermal inertia, and a high modulus of elasticity that provides high quality bearing tracks, is relatively lightweight and is not limited in size or configuration, yet can be produced with a short lead-time at a moderate cost.

DISCLOSURE OF INVENTION

According to the present invention, a composite structure for use in a coordinate measuring machine is provided including a metallic material joined to a non-metallic material, wherein each material possesses a coefficient of thermal expansion (CTE) less than or equal to $6.1 \times 10^{-6}$ cm/cm/° C. By way of example, the metallic material may be INVAR, an alloy of iron and nickel, the non-metallic material may be carbon fiber reinforced composite, and CTE is approximately the same for each material. Also, CTE may be approximately $1.8 \times 10^{-6}$ cm/cm/° C. ($1.0 \times 10^{-6}$ inch/inch/° F.) or less. Further, the INVAR material may be in the shape of a modified I-beam and the carbon fiber material may be in the shape of a square tube. In such shapes, the INVAR is essentially a space frame and the carbon fiber is essentially a stiffener.

Also, a coordinate measuring machine (CMM) is provided including a support structure joined to a plurality of trusses and a probe operatively attached to the support structure, wherein the support structure has a CTE less than or equal to $6.1 \times 10^{-6}$ cm/cm/° C. and a modulus of elasticity greater than 140 GPa in any direction. By way of example, the support structure may be a composite structure as described above with metallic and non-metallic materials. Such materials may be INVAR and carbon fiber reinforced composite, respectively, and may be formed into a space frame and stiffener assembly.

Additionally, a method for fabricating a CMM is provided including the steps of joining a support structure to a plurality of trusses and operatively attaching a probe to the support structure, wherein the support structure has a coefficient of thermal expansion less than or equal to $6.1 \times 10^{-6}$ cm/cm/° C. and a modulus of elasticity greater than 140 GPa in any direction. As an example, the method may additionally comprise the step of fabricating the support structure by joining a metallic material to a non-metallic material.

As used herein, the term "space frame" denotes a three-dimensional structure composed of interconnected members, attaining a high strength-to-weight ratio, that is capable of supporting loads and, if so designed, resisting other forces.

The foregoing and other features and advantages of the present invention will be apparent from the following more particular description of preferred embodiments of the invention, as illustrated in the accompanying drawings.

BRIEF DESCRIPTION OF DRAWINGS

Preferred embodiments of the present invention will hereinafter be described in conjunction with the appended drawings, where like designations denote like elements, and.

BEST MODE FOR CARRYING OUT THE INVENTION

According to a preferred embodiment of the present invention, a composite structure for use in a coordinate measuring machine (CMM) is provided including a metallic material joined to a non-metallic material, wherein each material possesses a coefficient of thermal expansion (CTE) less than or equal to $6.1 \times 10^{-6}$ cm/cm/° C. CTE is preferably approximately $1.8 \times 10^{-6}$ cm/cm/° C. or less. Also preferably, the metallic material is INVAR, an alloy of 63 to 66 percent iron and 34 to 37 percent nickel, and the non-metallic material is carbon fiber reinforced composite. Most preferably, INVAR 36 is used, i.e. having 36% nickel. Also, the metallic material is preferably in the shape of a space frame with the non-metallic material preferably in the shape of stiffeners adhered to the space frame. The modulus of elasticity of the combined space frame and stiffeners is preferably greater 140 GPa. A preferred space frame is a modified I-beam having diagonal braces joining opposing faces of two I-beam flanges and having triangular cutouts through the body of the I-beam in a triangular region defined by a flange on one side and diagonal braces on two sides. A preferred stiffener is a beam having a hollow, square cross-section, wherein one stiffener is adhered to each I-beam flange of the space frame. Additionally, a method for fabricating a CMM is provided including the steps of assembling and/or fabricating the materials and structures described above.

An apparatus according to the present invention is particularly useful for a carriage guideway in a horizontal arm or bridge-style CMM, but it is also useful in other CMM structures. Such a guideway has a low thermal inertia, provides high quality bearing tracks on the composite, is relatively lightweight, and is not limited in size or configuration, yet it can be produced with a short lead-time at a moderate cost.

Figure 1:
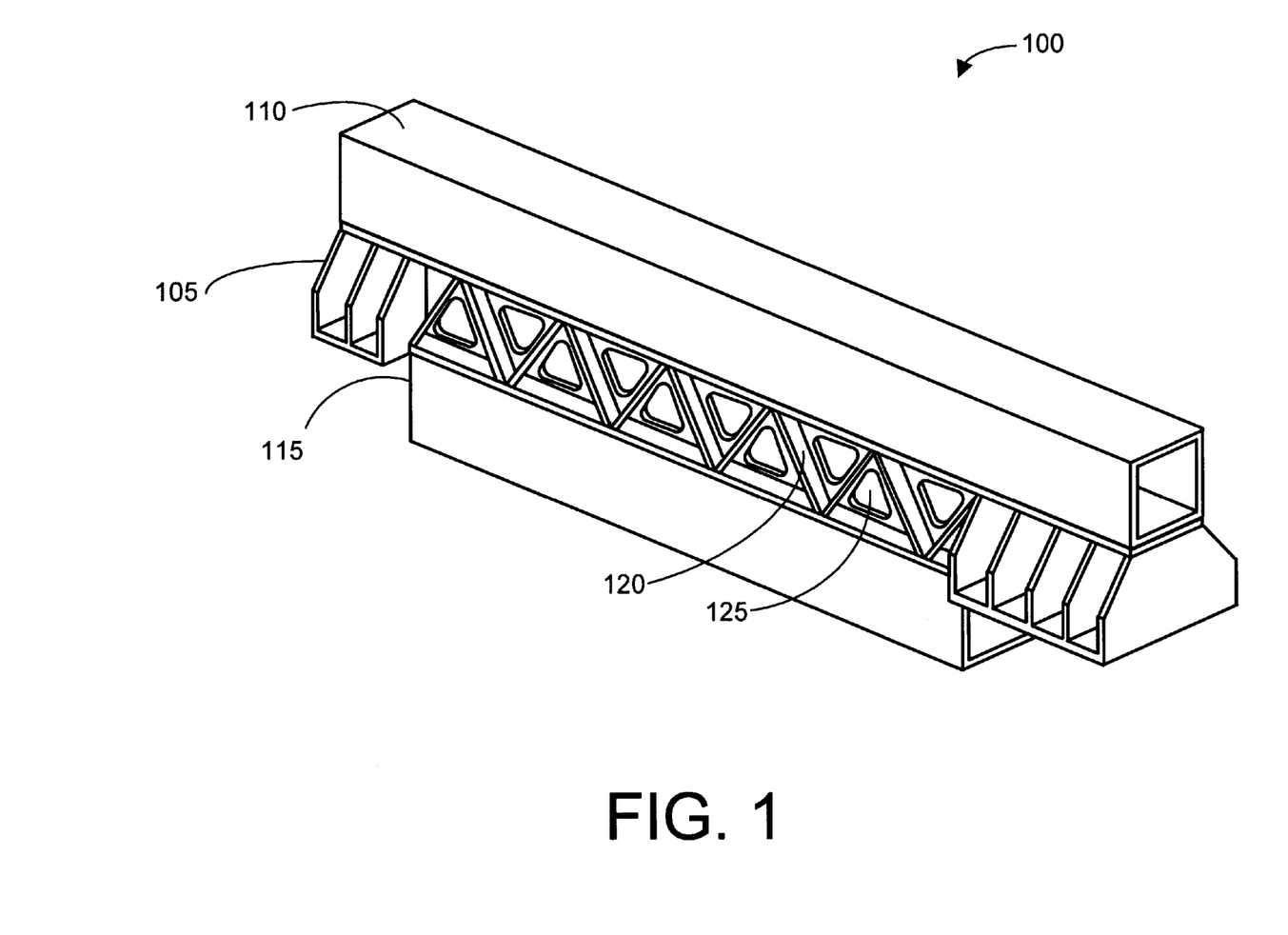
FIG. 1 is a perspective view of a composite measuring machine (CMM) guideway according to a preferred embodiment of the present invention.
Figure 2:
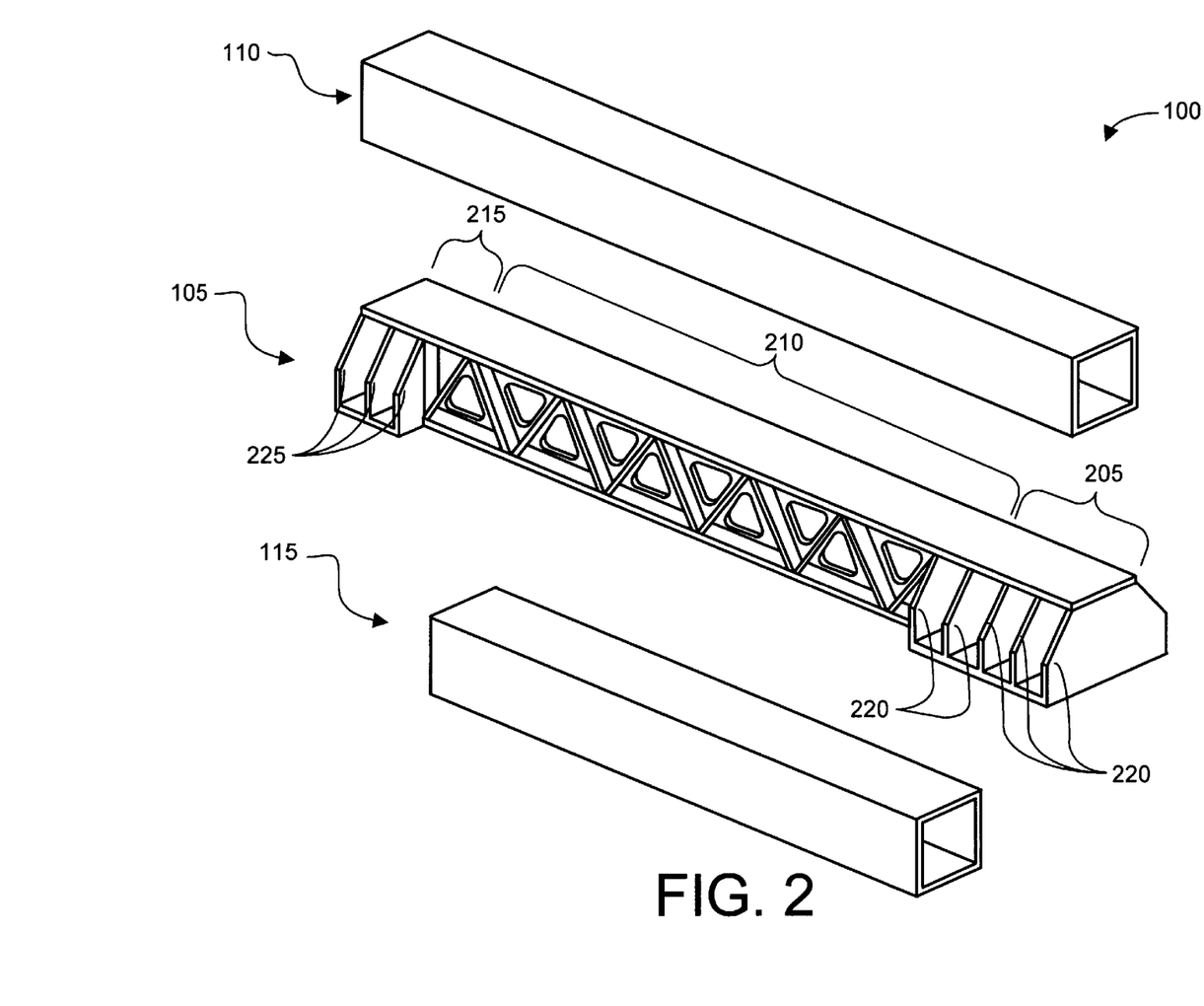
FIG. 2 is an exploded perspective view of the guideway in FIG. 1.

Referring to FIGS. 1 and 2, a CMM guideway 100 according to a preferred embodiment of the present invention is displayed. Guideway 100 includes a space frame 105, an outer stiffener 110, and an inner stiffener 115. Space frame 105 may possess many different configurations within the scope of the present invention, however, the modified I-beam configuration displayed is one that has proven suitable. The space frame 105 includes a large base 205, an I-beam portion 210, and a small base 215. One of the advantages of using metal in structural members is that individual members typically may be joined with other members using conventional fastening and joining techniques. Such techniques include welding, pinning and screws. By contrast, fiber reinforced composites often require specialized joining and fastening techniques to properly assemble an apparatus, such as bonding and clamping. Space frame 105 includes large base 205 and small base 215 that may be joined to other structures in a CMM with conventional techniques. Notably, the shape and dimensions of bases 205 and 215 are determined by the particular use of space frame 105. Space frame 105 as depicted is adapted for use in a bridge-style CMM such as the one shown in FIG. 4 and discussed below. Accordingly, bases 205 and 215 are sized to match with corresponding platforms (not shown) on other components in the bridge-style CMM of FIG. 4. Also, the configuration of bases 205 and 215 with support members 220 and 225, respectively, shown in FIG. 2 is adapted to provide the support needed in the bridge-style CMM of FIG. 4.

Figure 3:
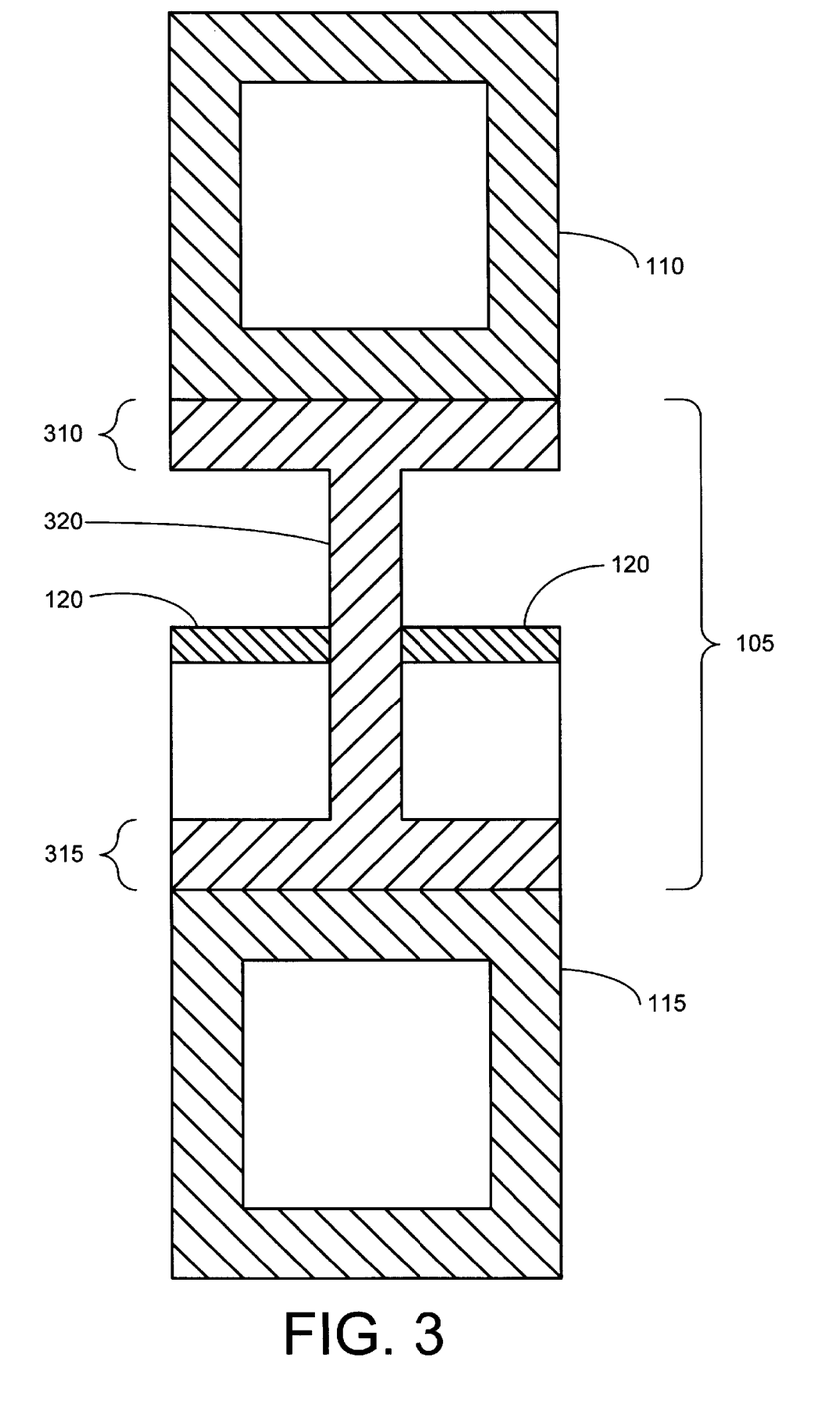
FIG. 3 is a cross-sectional view of the guideway in FIGS. 1 and 4 taken along lines 3—3 shown in FIG. 4.

As shown in FIGS. 1 to 3, I-beam portion 210 further includes diagonal braces 120, cutouts 125, an outer flange 310, an inner flange 315, and a body portion 320. One of the important features of the structures in a CMM is their stiffness-to-weight ratio. Some materials, such as alumina-ceramic, have a high modulus of elasticity and are often sufficiently stiff for use in a CMM without designing specialized geometries for structural members. Other materials, such as fiber reinforced composites, have a high modulus of elasticity only in selected directions, depending on their method of construction. Such materials are almost always anisotropic, meaning their mechanical properties, such as stiffness and strength, are limited to the specific directions designed into the component. Still other materials, such as INVAR 36, have a lower modulus of elasticity and may require specialized geometries to provide sufficient stiffness. However, in the present invention, a specialized geometry is not required to make use of INVAR 36. Instead, a fiber reinforced composite with a high modulus of elasticity is combined with INVAR 36 to provide a sufficiently stiff guideway 100. Of course, diagonal braces 120 may be joined between opposing faces of outer flange 310 and inner flange 315 to increase stiffness even further. Preferably, such braces 120 are joined to outer flange 310 and inner flange 315 by tungsten inert gas (TIG) welding, but other types of welding and attachment mechanisms may be used. Diagonal braces 120 may be joined to body portion 320 in addition to being joined with flanges 310 and 315.

Figure 4:
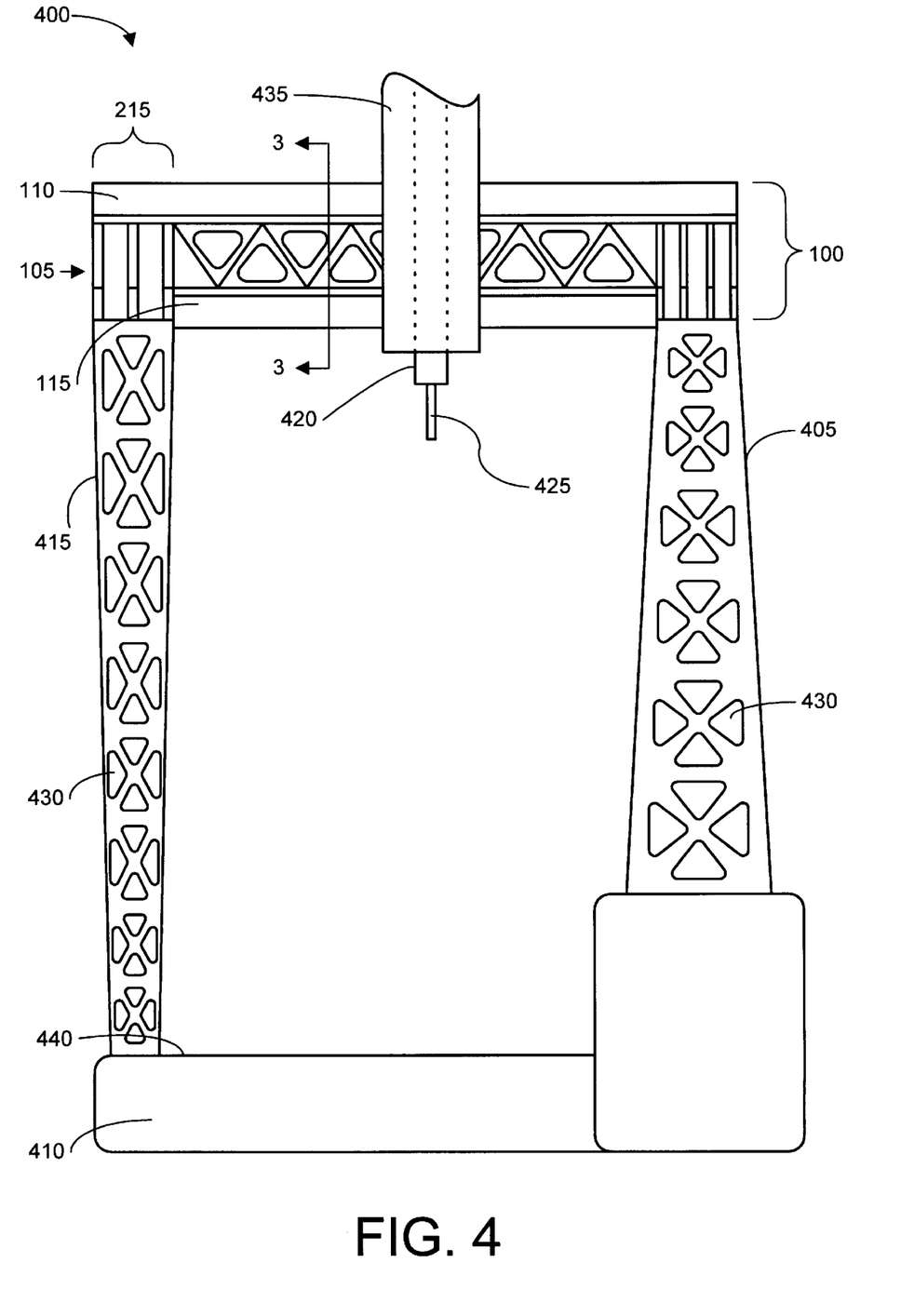
FIG. 4 is front view of a bridge-style CMM according to a preferred embodiment of the present invention.

Cutouts 125 are formed in body portion 320 such that regions of body portion 320 not contributing to the stiffness of space frame 105 are removed. For example, a triangular region defined by flange 310 or 315 on one side and diagonal supports 120 on two sides may be partially removed as shown in FIGS. 1, 2, and 4. Alternatively, cutouts 125 may be in the form of other geometric shapes, such as squares, pentagons, hexagons, etc., not necessarily defined by diagonal supports 120. Further, diagonal supports 120 may be arranged so as to define other geometric shapes, such as those listed, aside from triangles. By forming cutouts 125 and diagonal supports 120, the mass of space frame 105 may be reduced to provide a more lightweight guideway 100. Also, the thermal inertia of space frame 105 will be reduced since the reduction in mass means that less total heat transfer must occur to stabilize space frame 105 at ambient temperature.

Outer flange 310 and inner flange 315 are sized and prepared for joining with outer stiffener 110 and inner stiffener 115, respectively. Preferably, flanges 310 and 315 and stiffeners 110 and 115 are machined to achieve an acceptable degree of flatness and parallelism so that they can be joined without gaps or later misalignment with other CMM structures or devices. Preferably, flanges 310 and 315 are joined to stiffeners 110 and 115, respectively, using an epoxy adhesive possessing a high shear strength such that guideway 100 possesses characteristics contributed both from the fiber reinforced composite of stiffeners 110 and 115 and the INVAR 36 of space frame 105. Also, such an epoxy adhesive is preferably adapted to the particular substrates, that is, INVAR 36 and fiber reinforced composite. Alternatively, the elements of the assembly may be joined by other methods or mechanisms, however, it may be that other joining methods or mechanisms do not yield all of the same beneficial characteristics in guideway 100. Specifically, the INVAR 36 of space frame 105 and fiber reinforced composite of stiffeners 110 and 115 possess a very low CTE, however, space frame 105 has a high modulus of elasticity in all directions while stiffeners 110 and 115 may have a low modulus in specific directions. Accordingly, guideway 100 will possess a low CTE contributed from both space frame 105 and stiffeners 110 and 115. Also, stiffeners 110 and 115 will impart increased stiffness to space frame 105 and cause guideway 100 to possess a modulus of elasticity greater than that of space frame 105 alone. Thus, it can be seen that combining INVAR 36 with a fiber reinforced composite provides guideway 105 with a low CTE and a high modulus of elasticity, two important elements in fabricating superior CMM components, such as guideway 100.

There are other significant advantages achieved by combining INVAR 36 in space frame 105 with fiber reinforced composite in stiffeners 110 and 115. For example, stiffeners 110 and 115 are anisotropic while space frame 105 is isotropic, thus space frame 105 will enhance the stability of stiffeners 110 and 115 in all directions. Also, the composite of stiffeners 110 and 115 is less dense than the INVAR 36 of space frame 105. The lower density provides the benefit of increased stiffness with a more lightweight additional structure than could be obtained by adding an INVAR 36 or other metallic structure. It is also significant that stiffeners 110 and 115 may be selected to have a CTE substantially similar to space frame 105. If the CTE of stiffeners 110 and 115 is the same as the CTE of space frame 105, then no "bimetallic effect" will occur. Otherwise, the "bimetallic effect" would introduce errors into CMM measurements when a first material in a given structure expands or contracts more for a given temperature change than a second material with a differing CTE. The differing CTEs, accordingly, could cause changes in geometry of CMM structures. It is also an advantage of the present invention that guideway 100 is not limited in size or configuration as it would be if manufactured from alumina-ceramic. Also, space frame 105 can be fabricated by TIG welding pieces cut from plates of INVAR 36 without requiring a long lead time as with alumina-ceramic. Similarly, stiffeners 110 and 115 may be fabricated in advance without a long lead time so that they are prepared for adhering to flanges 310 and 315 of space frame 105 once its fabrication is complete. In all, the above advantages and low cost of fabrication lead to far superior CMM structures, such as guideway 100, with a moderate total cost despite the relatively high cost of INVAR 36 stock.

Often INVAR 36 is only available in plate and round form. Accordingly, a preferred method of fabricating space frame 105 is to cut individual components from INVAR plate with an abrasive waterjet or other shape cutting machine, such as laser or plasma, to assemble the components into space frame 105 by aligning tabs and slots formed in adjoining components, and then to fully TIG weld the assembly. Clearly, multiple other methods of fabrication and structural designs may conceivably be used to create a space frame 105 according the present invention that is suitable for use in a CMM after combination with stiffeners 110 and 115. The preferred embodiment depicted in the appended figures is simply one example of a suitable space frame.

Preferably, stiffeners 110 and 115 are previously laid up and cured by conventional methods and made ready for bonding to space frame 105. The cured assembly may then be ground, if necessary, and lapped to achieve the specific tolerances required for the overall structure. Carbon fiber is one type of fiber that is particularly suitable for the fiber reinforced composite discussed above. Carbon fiber composites may be produced with fibers possessing a modulus of elasticity as high as $150 \times 10^6$ psi and a CTE as low as $0.1 \times 10^{-6}$ cm/cm/° C. and lower. Carbon fiber products are produced by a lay-up method either by hand or automated machine using sheets of fiber known as "pre-preg" that are impregnated with epoxy, acrylic or vinylester resin. Pre-preg sheets are available in uni-directional form (all fibers arranged in one direction) and in woven form (intertwined fibers). Multiple plies of uni-directional and/or woven pre-preg are laid upon one another in specific orientations and laminated to produce a sheet with desired characteristics of mechanical properties and shape.

Figure 6:
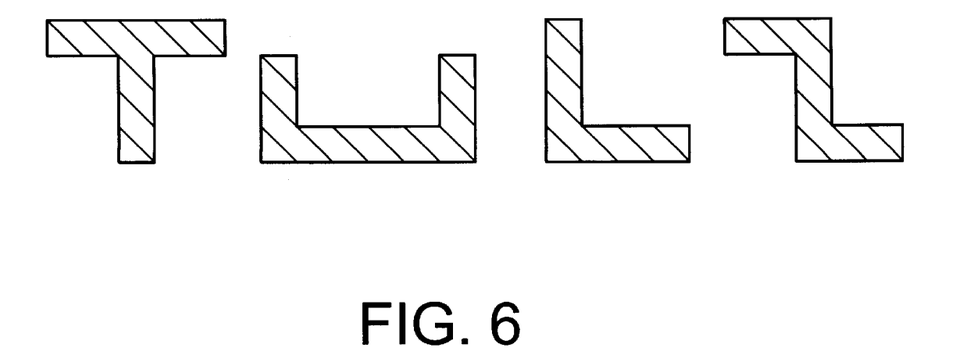
FIG. 6 is a sectional view of exemplary T-, U-, L-, and Z-sections for stiffeners according to embodiments of the present invention.

Stiffeners 110 and 115 are preferably in the shape of a beam having a cross section selected from the group consisting of a polygon, semi-circle, I-section, T-section, U-section, L-section, and Z-section. Exemplary T-, U-, L-, and Z-sections are shown in FIG. 6. Stiffeners 110 and 115 are most preferably in the shape of a beam having a hollow, square cross-section, that is, a square tube as shown in FIGS. 1 to 3. Given that plies can be arranged in a specific schedule according to the intended use, a sheet or product can be engineered to optimize its strength/stiffness in a specific direction. As with other fiber composites, carbon fiber composites are generally anisotropic. Therefore, complete structures of carbon fiber are not always practical due to the extremely high cost of producing structures with sufficient strength, stiffness, or some other characteristic in all desired directions.

As shown in FIG. 4, a preferred embodiment of the present invention is a bridge-style CMM 400 that includes a static base 410, a large truss 405, a small truss 415, a guideway 100, a carriage 435, a spindle 420, and a probe 425. Large and small trusses 405 and 415 are essentially legs resting on base 410 that are designed to support guideway 100. In turn, guideway 100 supports carriage 435, which in turn supports spindle 420 that includes a mechanism for extending and withdrawing probe 425. The various elements of bridge-style CMM 400 provide movement of probe 425 in three dimensions to align the tip of probe 425 with multiple features on the surface of a work piece (not shown), such that the work piece may be mapped out within a prearranged coordinate system. For example, movement of carriage 435 along guideway 100 may provide probe 425 movement in one dimension, movement of trusses 405 and 415 forward and backward on base 410 may provide movement in a second dimension, and withdrawing and extending probe 425 on spindle 420 may provide movement in the third dimension.

Static base 410 is preferably fabricated from granite because of its good damping characteristics, however, other materials may also be suitable. Base 410 is preferably cuboid shaped, that is, a six-sided three dimensional object with rectangles for each side, wherein opposite sides are identical. The top surface 440, on which trusses 405 and 415 and a work piece are placed, is preferably ground to a very flat finish. A mechanism may be provided for moving trusses 405 and 415 backward and forward on base 410. Trusses 405 and 415 ride on air bearings and is computer controlled using methods and devices known to those skilled in the CMM art. Depending on the mechanism selected, the base 410 may need to be cut or shaped in a manner adapted to allow operation of the movement mechanism. Such cutting or shaping may change base 410 from its otherwise cuboid shape.

Figure 5:
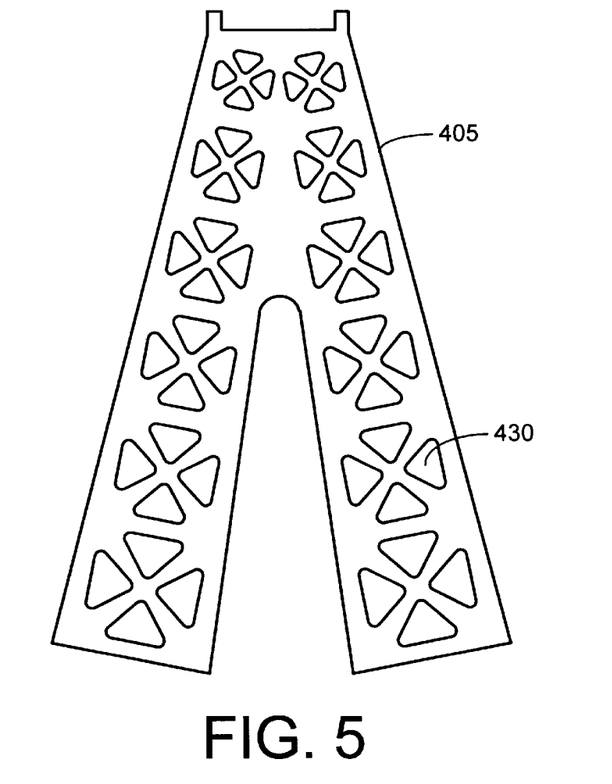
FIG. 5 is a side view of one truss for the bridge-style CMM of FIG. 4.

Trusses 405 and 415 may be fabricated in many forms, however, they are preferably of a space frame type of construction using INVAR 36, because of its low CTE, and somewhat resemble space frame 105. Accordingly, a preferred method of fabricating trusses 405 and 415 is to cut individual components from INVAR plate with an abrasive waterjet, to assemble the components into trusses 405 and 415 by aligning tabs and slots formed in adjoining components, and then to fully TIG weld the assembly. A preferred design is that shown in FIGS. 4 and 5, wherein each truss is essentially a square tube, wherein each of the four side walls of a tube is a section cut from INVAR plate, and wherein triangular cutouts 430 are formed in the side walls of the tube. Alternatively, cutouts of other geometric shapes, such as squares, pentagons, hexagons, etc., may be formed, but they are not preferred. Notably, a tube forming truss 405 or 415 may be tapered from a wide bottom end to a more narrow top end or vice versa. Also, as shown in FIG. 5, large truss 405 is preferably in the shape of an A-frame. Accordingly, only the bottom ends and top end of large truss 405 are shaped like square tubes as discussed above. Progressive cross sections of the intermediate portion of large truss 405, between the bottom ends and top end, would show a transition from two square tubes, to one rectangular tube, and finally to one square tube as is apparent from FIGS. 4 and 5.

The advantages of the space frame type of construction for trusses 405 and 415 are significant. Triangular cutouts 430 formed in the side walls of trusses 405 and 415 removed regions not contributing to the stiffness of trusses 405 and 415. In determining where to place and how to size cutouts 430, trusses 405 and 415 may be analyzed in keeping with standard practices of mechanical and civil engineering. In this manner, the mass of trusses 405 and 415 is reduced to provide a more lightweight structure. Also, the thermal inertia of the overall structure is reduced, since the reduction in mass means that less total heat transfer must occur to stabilize space frame 105 at ambient temperature. In addition, the heat transfer is improved because the open, lattice-type appearance of trusses 405 and 415 shown in FIGS. 4 and 5 allows ample circulation of ambient air, increasing the surface area exposed to ambient air and further decreasing the thermal inertia. By contrast, a truss made of a solid material or a tube without the lattice-type appearance will allow much less circulation, have a greater mass, and have a greater thermal inertia.

In bridge-style CMM 400 of FIG. 4, stiffeners 110 and 115 act both to stiffen guideway 100 in its support of spindle 420 and to provide air bearing tracks for carriage 435. The stiffening role is discussed above. To provide air bearing tracks, stiffeners 110 and 115 must be specially prepared by grinding and lapping their outer surfaces, thus, creating a track for the air bearings and guiding the path of carriage 435. Because of the high modulus of elasticity of guideway 100 and the high accuracy with which air bearing tracks may be prepared, movement of spindle 420 may be performed with high accuracy and precision.

Another preferred embodiment of the present invention is a horizontal arm CMM (not shown). Such a device is similar in many respects to bridge-style CMM 400, but some differences exist. For example, the spindle and probe of a horizontal arm CMM are oriented horizontally rather than as shown in FIG. 4 with a vertical orientation. All the principles discussed above for combining fiber-reinforced composites with INVAR structures and for forming structures with a lattice-type appearance are applicable to a horizontal arm CMM. Of course, the design of the specific structures may be somewhat different from that shown in the appended figures to provide three dimensional movement of the probe when the spindle is in a horizontal position. Generally, it is suitable to design such structures in keeping with standard practices of mechanical and civil engineering, while incorporating the principles of the present invention described herein.

In at least one respect, the significance of the present invention is even more critical for a horizontal arm CMM than it is for a bridge-style CMM. Because the spindle is horizontal, extending and withdrawing the probe will create variable cantilever stresses in the guideway that supports the carriage and spindle. Also, depending on the position of the spindle on the guideway, other variable stresses will be created in the structures supporting the guideway, whether they be trusses or some other structures. Accordingly, the stiffness and mass of the guideway and other structures will greatly influence whether the straightness of the probe path stays within tolerance while extending the probe horizontally. Without the present invention, it is extremely difficult, and perhaps impossible, to provide a horizontal arm CMM with a CTE less than or equal to $6.1 \times 10^{-6}$ cm/cm/° C. and a low thermal inertia and still maintain the accuracy and precision presently in demand.

According to the present invention, a method for fabricating a CMM, such as a bridge-style or horizontal arm CMM, includes the steps of joining a support structure to a plurality of trusses and operatively attaching a probe to the support structure. Such a support structure preferably has a CTE less than or equal to $6.1 \times 10^{-6}$ cm/cm/° C. and a modulus of elasticity greater than 140 GPa in any direction.

More preferably, the support structure is fabricated by joining a metallic material to a non-metallic material, each possessing a coefficient of thermal expansion less than or equal to $6.1 \times 10^{-6}$ cm/cm/° C. Most preferably, the support structure is fabricated from INVAR 36 in the form of a space frame joined to a carbon fiber reinforced composite in the form of a stiffener. Such a space frame and stiffener and preferred and alternative embodiments thereof are described above.

While the invention has been particularly shown and described with reference to preferred embodiments thereof, it will be understood by those skilled in the art that various changes in form and details may be made therein without departing from the spirit and scope of the invention. Accordingly, unless otherwise specified, any dimensions of the apparatus indicated in the drawings or herein are given as an example of possible dimensions and not as a limitation. Similarly, unless otherwise specified, any sequence of steps of the method indicated herein are given as an example of a possible sequence and not as a limitation.

What is claimed is:

1. A coordinate measuring machine comprising:
   a) a support structure joined with a plurality of trusses, the support structure comprising a guideway, the guideway comprising:
      1. an elongate spaceframe comprising a metallic material; and
      2. a first stiffener having a first elongate bearing surface facing in a first direction and a second bearing surface disposed upon said elongate spaceframe, the first stiffener comprising a first fiber reinforced composite material; and
   b) a probe attached to a carriage that houses a first bearing, such that the first bearing engages the first bearing surface to support the carriage and allow the carriage to move along the guideway, wherein the elongate spaceframe and the first stiffener each have a coefficient of thermal expansion (CTE) less than or equal to $6.1 \times 10^{-6}$ cm/cm/° C. and a modulus of elasticity greater than 140 GPa in all directions.

2. The coordinate measuring machine of claim 1, wherein:
   a) the metallic material is an alloy of 34 to 37% nickel and 63 to 66% iron;
   b) the first fiber reinforced composite material is a carbon fiber reinforced composite; and
   c) CTE is approximately the same for the metallic material and the first fiber reinforced composite material.

3. The coordinate measuring machine of claim 1, wherein at least a part of the spaceframe comprises a modified I-beam having diagonal braces joining opposing faces of two I-beam flanges and having triangular cutouts through a body portion of the I-beam.

4. The coordinate measuring machine of claim 1, wherein the first stiffener comprises a beam having a cross section selected from the group consisting of a polygon, semi-circle, I-section, T-section, U-section, L-section, and Z-section.

5. The coordinate measuring machine of claim 1, wherein the first stiffener has a hollow, square cross section and wherein the fiber reinforced composite is carbon fiber reinforced composite.

6. The coordinate measuring machine of claim 1, wherein the guideway is suspended by the plurality of trusses joined to a base and the trusses include a means for reducing thermal inertia.

7. The coordinate measuring machine of claim 6, wherein the means for reducing thermal inertia comprises each truss of the plurality of trusses possessing side walls with cutouts formed therein such that portions of the trusses not contributing to stiffness are removed and an increased surface area is exposed to ambient air.

8. The coordinate measuring machine of claim 7, wherein the cutouts are triangular.

9. The coordinate measuring machine of claim 1, wherein:
   a) each said truss includes a substantially square tube with four side walls formed from welded sections of plate metal; and
   b) at least one of said trusses is in the shape of an A-frame.

10. The coordinate measuring machine of claim 7, wherein the cutouts create a lattice-type appearance in the side walls of the trusses.

11. The coordinate measuring machine of claim 1, wherein the guideway further comprises a second stiffener having a second elongate bearing surface facing in a second direction that is opposite the first direction, the second stiffener comprising a second fiber reinforced composite material, wherein the spaceframe extends in the second direction from the first stiffener to the second stiffener, thereby joining the first stiffener and the second stiffener, wherein the carriage houses a second bearing that engages the second bearing surface to support the carriage and allow the carriage to move along the guideway, and wherein the second stiffener extends in the second direction beyond the spaceframe.

12. The coordinate measuring machine of claim 11, wherein the first bearing comprises an air bearing and wherein the second bearing comprises an air bearing.

13. The coordinate measuring machine of claim 1, wherein the first bearing surface is ground and lapped.

14. A method for fabricating a coordinate measuring machine comprising:
   a) forming a guideway, the step of forming a guideway including joining a first stiffener to a spaceframe so that a first elongate bearing surface of the first stiffener faces away from the spaceframe in a first direction, the first stiffener comprising a first fiber reinforced composite material and the spaceframe comprising, a metallic material;
   b) joining the spaceframe to at least one truss to form a support structure; and
   c) attaching a probe to a carriage, the carriage housing a first bearing;
   d) operatively attaching the carriage to the guideway, such that the first bearing engages the first bearing surface to support the carriage and allow the carriage to move along the guideway, wherein the spaceframe and the first stiffener each have a coefficient of thermal expansion (CTE) less than or equal to $6.1 \times 10^{-6}$ cm/cm/° C. and a modulus of elasticity greater than 140 GPa in all directions.

15. The method of claim 14, wherein:
   a) the metallic material is an alloy of 34 to 37% nickel and 63 to 66% iron;
   b) the fiber reinforced composite material is a carbon fiber reinforced composite; and
   c) CTE is approximately the same for the metallic material and the fiber reinforced composite material.

16. The method of claim 14, wherein at least a part of the space frame comprises a modified I-beam having diagonal braces joining opposing faces of two I-beam flanges and having triangular cutouts through a body portion of the I-beam.

17. The method of claim 14, wherein the first stiffener comprises a beam having a cross section selected from the group consisting of a polygon, semi-circle, I-section, T-section, U-section, L-section, and Z-section.

18. The method of claim 17, wherein the first stiffener has a hollow, square cross section and wherein the fiber reinforced composite is a carbon fiber reinforced composite.

19. The method of claim 14, wherein:
  a) the support structure comprises the guideway suspended by the at least one truss joined to a base; and
  b) the at least one truss includes a means for reducing thermal inertia.

20. The method of claim 19, wherein the means for reducing thermal inertia comprises the at least one truss possessing side walls with cutouts formed therein such that portions of the at least one truss not contributing to stiffness are removed and an increased surface area is exposed to ambient air.

21. The method of claim 20, wherein the cutouts are triangular.

22. The method of claim 20, wherein the cutouts create a lattice-type appearance in the side walls of the at least one truss.

23. The method of claim 14, further comprising the step of joining a second stiffener to the spaceframe so that a second elongate bearing surface of the second stiffener faces in a second direction that is opposite the first direction and so that the spaceframe extends in the second direction from the first stiffener to the second stiffener, thereby joining the first stiffener and the second stiffener so that the guideway comprises the first stiffener, the second stiffener and the spaceframe, the second stiffener comprising a second fiber reinforced composite material, wherein the step of operatively attaching the carriage to the guideway is performed such that a second bearing of the carriage engages the second bearing surface to support the carriage and allow the carriage to move along the guideway, and wherein the second stiffener extends in the second direction beyond the spaceframe.

24. The method of claim 23, wherein the first bearing comprises an air bearing and wherein the second bearing comprises an air bearing.

25. The method of claim 14, wherein the step of forming a guideway further includes the step of grinding the first bearing surface and lapping the first bearing surface.

* * * * *